(12) United States Patent
Athlur et al.

(10) Patent No.: US 11,671,254 B2
(45) Date of Patent: **\*Jun. 6, 2023**

(54) EXTENDED REALITY AUTHENTICATION

(71) Applicant: Citrix Systems, Inc., Fort Lauderdale, FL (US)

(72) Inventors: Anudeep Athlur, Karnataka (IN); Praveen Raja Dhanabalan, Bangalore (IN); Anuj Magazine, Karnataka (IN)

(73) Assignee: Citrix Systems, Inc., Fort Lauderdale, NJ (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/662,711

(22) Filed: May 10, 2022

(65) Prior Publication Data

US 2022/0271934 A1 Aug. 25, 2022

Related U.S. Application Data

(63) Continuation of application No. 16/887,853, filed on May 29, 2020, now Pat. No. 11,362,825.

(30) Foreign Application Priority Data

Mar. 30, 2020 (IN) .............................. 202041013805

(51) Int. Cl.
*H04L 29/06* (2006.01)
*H04L 9/30* (2006.01)
(Continued)

(52) U.S. Cl.
CPC ............ *H04L 9/3033* (2013.01); *G06F 21/45* (2013.01); *G06V 20/10* (2022.01); *H04L 9/0869* (2013.01);
(Continued)

(58) Field of Classification Search
CPC ..... H04L 9/3033; H04L 9/0869; H04L 63/08; H04L 63/0428; G06V 20/10; G06F 21/45; G06F 7/582
(Continued)

(56) References Cited

U.S. PATENT DOCUMENTS

2019/0227694 A1\* 7/2019 Shin ....................... G06F 3/017
2019/0354669 A1 11/2019 Brantley
(Continued)

FOREIGN PATENT DOCUMENTS

EP 2887253 A1 6/2015

OTHER PUBLICATIONS

Sep. 10, 2021—(WO) International Search Report and Written Opinion—App PCT/US2021/033390.
Apr. 21, 2022 (EP)—Communication App 21733273.3.

*Primary Examiner* — Evans Desrosiers (57) ABSTRACT

Methods and systems for secure authentication in an extended reality (XR) environment are described herein. An XR environment may be output by a computing device and for display on a device configured to be worn by a user. A first plurality of images may be determined via the XR environment. The first plurality of images may be determined based on a user looking at a plurality of objects, real or virtual, in the XR environment. The first plurality of images may be sent to a server, and the server may return a second plurality of images. A public key and private key may be determined based on different portions of each of the second plurality of images. The public key may be sent to the server to register and/or authenticate subsequent communications between the computing device and the server.

20 Claims, 4 Drawing Sheets

(51) Int. Cl.
  *G06V 20/10* (2022.01)
  *G06F 21/45* (2013.01)
  *H04L 9/08* (2006.01)
  *H04L 9/40* (2022.01)
  *G06F 7/58* (2006.01)

(52) U.S. Cl.
  CPC .......... *H04L 63/0428* (2013.01); *H04L 63/08* (2013.01); *G06F 7/582* (2013.01)

(58) Field of Classification Search
  USPC .......................................................... 726/6
  See application file for complete search history.

(56) References Cited

U.S. PATENT DOCUMENTS

2020/0045016 A1* 2/2020 Chor .................. H04L 63/0442
2022/0028302 A1* 1/2022 Takatsuka ............. H04L 9/0825

* cited by examiner

EXTENDED REALITY AUTHENTICATION

RELATED APPLICATION

This application is a continuation of U.S. patent application Ser. No. 16/887,853 entitled "Extended Reality Authentication," which claims priority to Indian Application No. 202041013805, both of which are hereby expressly incorporated by reference in their entirety.

FIELD

Aspects described herein generally relate to extended reality (e.g., virtual reality, augmented reality, mixed reality), computer authentication, computer networking, and hardware and software related thereto. More specifically, one or more aspects describe herein provide for securely authenticating users in extended reality environments based on objects presented in the extended reality environments.

BACKGROUND

Authenticating users in extended reality (XR) environments can be particularly difficult. Conventional methods of authentication, such as requiring that users provide a username and password, are possible in XR environments, but can be inconvenient. A user might be asked to locate a real keyboard and input a username/password, but such a solution might be difficult because the user might not be able to see the keyboard and/or might be forced to put down motion controllers to use the keyboard. The user might be asked to use a virtual keyboard, but such a keyboard may be difficult to use given current motion tracking technology. The user may be asked to use other input methods such as voice recognition, but such input methods can be imprecise and may be heard by others around the user.

SUMMARY

The following presents a simplified summary of various aspects described herein. This summary is not an extensive overview, and is not intended to identify required or critical elements or to delineate the scope of the claims. The following summary merely presents some concepts in a simplified form as an introductory prelude to the more detailed description provided below.

To overcome limitations in the prior art described above, and to overcome other limitations that will be apparent upon reading and understanding the present specification, aspects described herein are directed towards securely authenticating users in extended reality (XR) environments.

A computing device may output an XR environment for display on a device configured to be worn by a user. The computing device may determine a first plurality of images. The first plurality of images may be determined based on the user looking at a plurality of objects in the XR environment. The computing device may send the first plurality of images to a server. The computing device may receive a second plurality of images from the server. Each of the second plurality of images may correspond to a different image of the first plurality of images. A public key may be determined based on a first portion of the second plurality of images. A private key may be determined based on a second portion of the second plurality of images. The public key may be sent to the server to authenticate subsequent communications between the computing device and the server.

Also, a computing device may output an XR environment for display on a device configured to be worn by a user. The computing device may determine a first plurality of images corresponding to a plurality of objects in the XR environment. A second plurality of images may be determined using an image recognition algorithm and based on the first plurality of images. A public key may be determined by generating a first bit string based on a first quantity of bits from each of the second plurality of images and by determining the public key based on the first bit string and using a pseudorandom number generator. A private key may be determined by generating a second bit string based on a second quantity of bits from each of the second plurality of images and by determining the private key based on the second bit string and using the pseudorandom number generator. The private key may be stored. The public key may be sent to a server and to authenticate subsequent communications between the computing device and the server.

Also, a server may receive, from a computing device, a first plurality of images. Each of the first plurality of images correspond to an image of an object in an XR environment. The server may determine a second plurality of images by determining, using an image recognition algorithm, an identity of each object in the first plurality of images; and retrieving, from a database, an image that corresponds to the identity of each object in the first plurality of images. The server may send, to the computing device, the second plurality of images. The server may receive, from the computing device, a public key configured to authenticate subsequent communications between the computing device and the server. The public key may have been generated based on the second plurality of images.

These and additional aspects will be appreciated with the benefit of the disclosures discussed in further detail below.

BRIEF DESCRIPTION OF THE DRAWINGS

A more complete understanding of aspects described herein and the advantages thereof may be acquired by referring to the following description in consideration of the accompanying drawings, in which like reference numbers indicate like features, and wherein.

DETAILED DESCRIPTION

In the following description of the various embodiments, reference is made to the accompanying drawings identified above and which form a part hereof, and in which is shown by way of illustration various embodiments in which aspects described herein may be practiced. It is to be understood that other embodiments may be utilized and structural and functional modifications may be made without departing from the scope described herein. Various aspects are capable of other embodiments and of being practiced or being carried out in various different ways.

As a general introduction to the subject matter described in more detail below, aspects described herein are directed towards authenticating users in an XR environment. A user of an XR device may desire to authenticate themselves with one or more servers to access content. For example, a user might desire to log in to a virtual reality chat application. Use of conventional authentication methods in the XR environment might be prohibitively difficult. For example, text input may be difficult to effectuate using input methods available to a user of an XR environment. As another example, voice authentication in the XR environment may be difficult in circumstances where ambient sounds are particularly loud.

It is to be understood that the phraseology and terminology used herein are for the purpose of description and should not be regarded as limiting. Rather, the phrases and terms used herein are to be given their broadest interpretation and meaning. The use of "including" and "comprising" and variations thereof is meant to encompass the items listed thereafter and equivalents thereof as well as additional items and equivalents thereof. The use of the terms "connected," "coupled," and similar terms, is meant to include both direct and indirect mounting and coupling.

Computing Architecture

Figure 1:
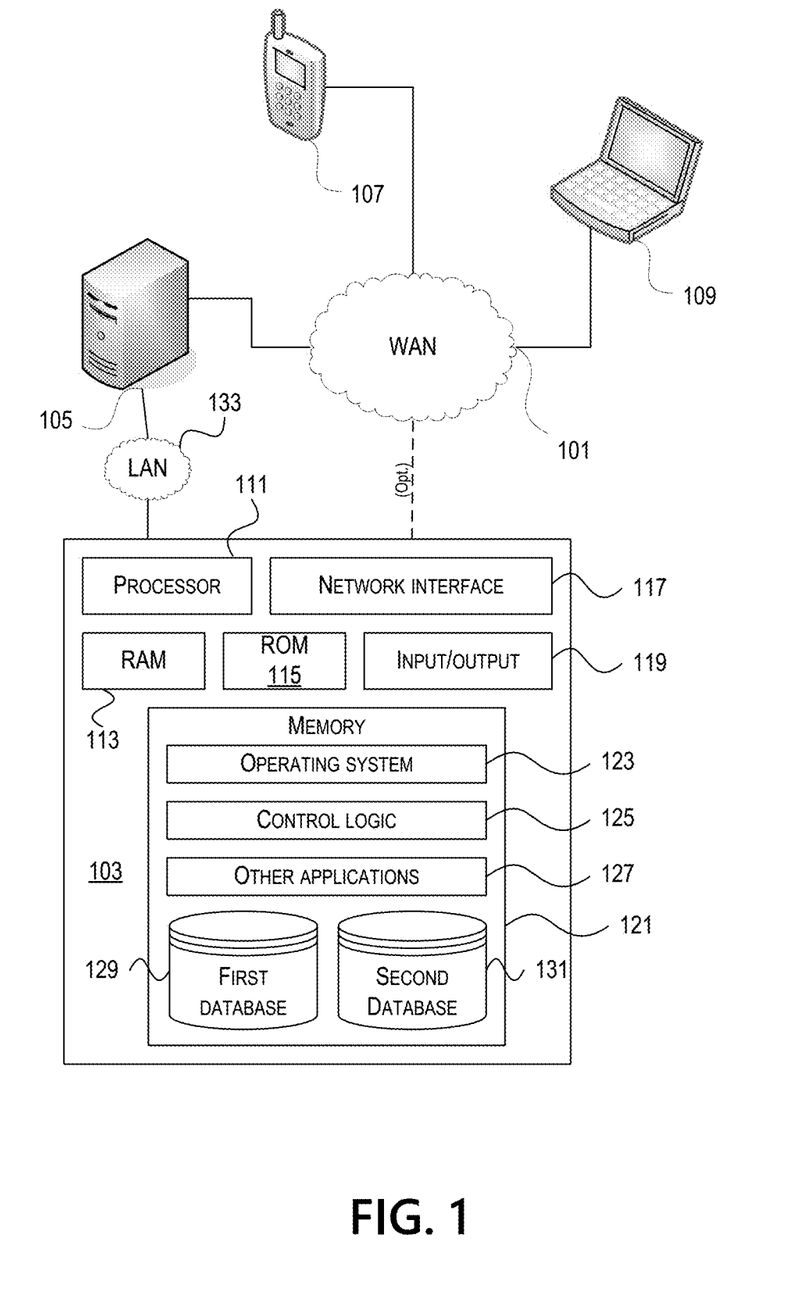
FIG. 1 depicts an illustrative computer system architecture that may be used in accordance with one or more illustrative aspects described herein.

Computer software, hardware, and networks may be utilized in a variety of different system environments, including standalone, networked, remote-access (also known as remote desktop), virtualized, and/or cloud-based environments, among others. FIG. 1 illustrates one example of a system architecture and data processing device that may be used to implement one or more illustrative aspects described herein in a standalone and/or networked environment. Various network nodes 103, 105, 107, and 109 may be interconnected via a wide area network (WAN) 101, such as the Internet. Other networks may also or alternatively be used, including private intranets, corporate networks, local area networks (LAN), metropolitan area networks (MAN), wireless networks, personal networks (PAN), and the like. Network 101 is for illustration purposes and may be replaced with fewer or additional computer networks. A local area network 133 may have one or more of any known LAN topology and may use one or more of a variety of different protocols, such as Ethernet. Devices 103, 105, 107, and 109 and other devices (not shown) may be connected to one or more of the networks via twisted pair wires, coaxial cable, fiber optics, radio waves, or other communication media.

The term "network" as used herein and depicted in the drawings refers not only to systems in which remote storage devices are coupled together via one or more communication paths, but also to stand-alone devices that may be coupled, from time to time, to such systems that have storage capability. Consequently, the term "network" includes not only a "physical network" but also a "content network," which is comprised of the data—attributable to a single entity—which resides across all physical networks.

The components may include data server 103, web server 105, and client computers 107, 109. Data server 103 provides overall access, control and administration of databases and control software for performing one or more illustrative aspects describe herein. Data server 103 may be connected to web server 105 through which users interact with and obtain data as requested. Alternatively, data server 103 may act as a web server itself and be directly connected to the Internet. Data server 103 may be connected to web server 105 through the local area network 133, the wide area network 101 (e.g., the Internet), via direct or indirect connection, or via some other network. Users may interact with the data server 103 using remote computers 107, 109, e.g., using a web browser to connect to the data server 103 via one or more externally exposed web sites hosted by web server 105. Client computers 107, 109 may be used in concert with data server 103 to access data stored therein, or may be used for other purposes. For example, from client device 107 a user may access web server 105 using an Internet browser, as is known in the art, or by executing a software application that communicates with web server 105 and/or data server 103 over a computer network (such as the Internet).

Servers and applications may be combined on the same physical machines, and retain separate virtual or logical addresses, or may reside on separate physical machines. FIG. 1 illustrates just one example of a network architecture that may be used, and those of skill in the art will appreciate that the specific network architecture and data processing devices used may vary, and are secondary to the functionality that they provide, as further described herein. For example, services provided by web server 105 and data server 103 may be combined on a single server.

Each component 103, 105, 107, 109 may be any type of known computer, server, or data processing device. Data server 103, e.g., may include a processor 111 controlling overall operation of the data server 103. Data server 103 may further include random access memory (RAM) 113, read only memory (ROM) 115, network interface 117, input/output interfaces 119 (e.g., keyboard, mouse, display, printer, etc.), and memory 121. Input/output (I/O) 119 may include a variety of interface units and drives for reading, writing, displaying, and/or printing data or files. Memory 121 may further store operating system software 123 for controlling overall operation of the data processing device 103, control logic 125 for instructing data server 103 to perform aspects described herein, and other application software 127 providing secondary, support, and/or other functionality which may or might not be used in conjunction with aspects described herein. The control logic 125 may also be referred to herein as the data server software 125. Functionality of the data server software 125 may refer to operations or decisions made automatically based on rules coded into the control logic 125, made manually by a user providing input into the system, and/or a combination of automatic processing based on user input (e.g., queries, data updates, etc.).

Memory 121 may also store data used in performance of one or more aspects described herein, including a first database 129 and a second database 131. In some embodiments, the first database 129 may include the second database 131 (e.g., as a separate table, report, etc.). That is, the information can be stored in a single database, or separated into different logical, virtual, or physical databases, depending on system design. Devices 105, 107, and 109 may have similar or different architecture as described with respect to device 103. Those of skill in the art will appreciate that the functionality of data processing device 103 (or device 105, 107, or 109) as described herein may be spread across multiple data processing devices, for example, to distribute processing load across multiple computers, to segregate transactions based on geographic location, user access level, quality of service (QoS), etc.

One or more aspects may be embodied in computer-usable or readable data and/or computer-executable instructions, such as in one or more program modules, executed by one or more computers or other devices as described herein. Generally, program modules include routines, programs, objects, components, data structures, etc. that perform particular tasks or implement particular abstract data types when executed by a processor in a computer or other device. The modules may be written in a source code programming language that is subsequently compiled for execution, or may be written in a scripting language such as (but not limited to) HyperText Markup Language (HTML) or Extensible Markup Language (XML). The computer executable instructions may be stored on a computer readable medium such as a nonvolatile storage device. Any suitable computer readable storage media may be utilized, including hard disks, CD-ROMs, optical storage devices, magnetic storage devices, solid state storage devices, and/or any combination thereof. In addition, various transmission (non-storage) media representing data or events as described herein may be transferred between a source and a destination in the form of electromagnetic waves traveling through signal-conducting media such as metal wires, optical fibers, and/or wireless transmission media (e.g., air and/or space). Various aspects described herein may be embodied as a method, a data processing system, or a computer program product. Therefore, various functionalities may be embodied in whole or in part in software, firmware, and/or hardware or hardware equivalents such as integrated circuits, field programmable gate arrays (FPGA), and the like. Particular data structures may be used to more effectively implement one or more aspects described herein, and such data structures are contemplated within the scope of computer executable instructions and computer-usable data described herein.

Figure 2:
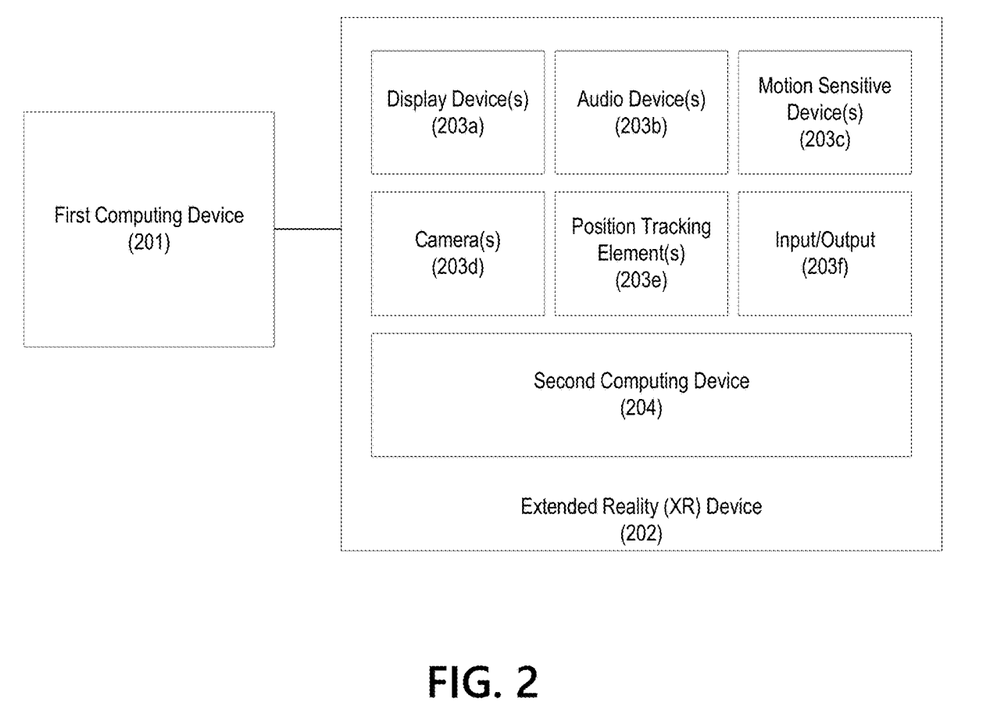
FIG. 2 depicts an illustrative XR device.

FIG. 2 depicts an example of an XR device 202. The XR device 202 may be configured to provide a VR, AR, and/or MR environment. The XR device 202 may be communicatively connected to a first computing device 201, which may be the same or similar as any of the components 103, 105, 107, 109. The XR device 202 may comprise a plurality of different elements, such as display devices 203a, audio devices 203b, motion sensitive devices 203c, cameras 203d, position tracking elements 203e, and input/output 203f. Such elements may additionally and/or alternatively be referred to as sensors. Other such elements, not shown, may include in-ear electroencephalographic (EEG) and/or heart rate variability (HRV) measuring devices, scalp and/or forehead-based EEG and/or HRV measurement devices, eye-tracking devices (e.g., using infrared), or the like. The XR device 202 may further comprise a second computing device 204, which may be the same or similar as any of the components 103, 105, 107, 109. Not all elements shown in FIG. 2 need to be present for operation of the XR device 202. For example, the XR device 202 might not have the cameras 203d. As another example, the XR device 202 might lack a second computing device 204, such that the first computing device 201 directly interfaces with the display devices 203a, the audio devices 203b, the motion sensitive devices 203c, the cameras 203d, the position tracking elements 203e, and/or the input/output 203f to provide an XR environment. As yet another example, the second computing device 204 may be sufficiently powerful enough such that the first computing device 201 may be omitted.

The first computing device 201 and/or the second computing device 204 need not have any particular processing power or functionality to provide an XR environment. The first computing device 201 and/or the second computing device 204 may comprise, for example, relatively underpowered processors which provide rudimentary video and/or audio. The first computing device 201 and/or the second computing device 204 may, for example, comprise relatively powerful processors which provide highly realistic video and/or audio.

Though described in many instances with respect to visually-based XR environments, the XR device 202 may provide audio-based XR environments. The XR device 202 need not have any of the display devices 203a, and may instead provide audio, touch, and/or scent-based environment(s). For example, the XR device 202 may provide an audio scenario in an XR environment which allows a user of the XR device 202 to practice conversation skills. As another example, the XR device 202 may provide a touch-based scenario which allows a user of the XR device 202 to practice being comfortable with unexpected touch sensations.

The XR device 202 may provide a VR, AR, and/or MR environment to the user. In general, VR environments provide an entirely virtual world, whereas AR and/or MR environments mix elements in the real world and the virtual world. The XR device 202 may be a device specifically configured to provide an XR environment (e.g., a VR headset), or may be a combination of devices (e.g., a smartphone inserted into a headset) which, when operated in a particular manner, provides an XR environment. The XR device 202 may be said to be untethered at least in part because it may lack a physical connection to another device (and, e.g., may be battery powered). If the XR device 202 is connected to another device (e.g., the first computing device 201, a power source, or the like), it may be said to be tethered. Examples of the XR device 202 may include the VALVE INDEX VR device developed by Valve Corporation of Bellevue, Wash., the OCULUS QUEST VR device sold by Facebook Technologies, LLC of Menlo Park, Calif., and the HTC VIVE VR device sold by HTC Corporation of New Taipei City, Taiwan. Examples of the XR device 202 may also include smartphones which may be placed into a headset for VR purposes, such as the GEAR VR product sold by Samsung Group of Seoul, South Korea. Examples of the XR device 202 may also include the AR headsets sold by Magic Leap, Inc. of Plantation, Fla., the HOLOLENS MR headsets sold by Microsoft Corporation of Redmond, Wash., and NREAL LIGHT headsets sold by Hangzhou Tairuo Technology Co., Ltd. of Beijing, China, among others. Examples of the XR device 202 may also include audio-based devices, such as the ECHO FRAMES sold by Amazon, Inc. of Seattle, Wash. All such VR devices may have different specifications. For example, some VR devices may have cameras, whereas others might not. These are merely examples, and other AR/VR systems may also or alternatively be used.

The first computing device 201 may provide all or portions of an XR environment to the XR device 202, e.g., as used by a tethered OCULUS RIFT. For example, the first computing device 201 may provide a video data stream to the XR device 202 that, when displayed by the XR device 202 (e.g., through the display devices 203a), shows a virtual world. Such a configuration may be advantageous where the XR device 202 (e.g., the second computing device 204 that is part of the XR device 202) is not powerful enough to display a full XR environment. The first computing device 201 need not be present for the XR device 202 to provide an XR environment. For example, where the second computing device 204 is sufficiently powerful, the first computing device 201 may be omitted, e.g., an untethered OCULUS QUEST.

The display devices 203a may be any devices configured to display all or portions of an XR environment. Such display devices 203a may comprise, for example, flat panel displays, such as one or more liquid-crystal display (LCD) panels. The display devices 203a may be the same or similar as the display 106. The display devices 203a may be singular or plural, and may be configured to display different images to different eyes of a user. For example, the display devices 203a may comprise one or more display devices coupled with lenses (e.g., Fresnel lenses) which separate all or portions of the displays for viewing by different eyes of a user.

The audio devices 203b may be any devices which may receive and/or output audio associated with an XR environment. For example, the audio devices 203b may comprise speakers which direct audio towards the ears of a user. As another example, the audio devices 203b may comprise one or more microphones which receive voice input from a user. The audio devices 203b may be used to provide an audio-based XR environment to a user of the XR device 202.

The motion sensitive devices 203c may be any elements which receive input related to the motion of a user of the XR device 202. For example, the motion sensitive devices 203c may comprise one or more accelerometers which may determine when a user of the XR device 202 is moving (e.g., leaning, moving forward, moving backwards, turning, or the like). Three dimensional accelerometers and/or gyroscopes may be used to determine full motion of the XR device 202. Optional external facing cameras 203d may be used for 3D orientation as well. The motion sensitive devices 203c may permit the XR device 202 to present an XR environment which changes based on the motion of a user.

The cameras 203d may be used to aid in the safety of the user as well as the presentation of an XR environment. The cameras 203d may be used to monitor the surroundings of a user so as to avoid the user inadvertently contacting elements (e.g., walls) in the real world. The cameras 203d may additionally and/or alternatively monitor the user (e.g., the eyes of the user, the focus of the user's eyes, the pupil dilation of the user, or the like) to determine which elements of an XR environment to render, the movement of the user in such an environment, or the like.

The position tracking elements 203e may be any elements configured to aid in the tracking of the position and/or movement of the XR device 202. The position tracking elements 203e may be all or portions of a system of infrared emitters which, when monitored by a sensor, indicate the position of the XR device 202 (e.g., the position of the XR device 202 in a room). The position tracking elements 203e may be configured to permit "inside-out" tracking, where the XR device 202 tracks the position of one or more elements (e.g., the XR device 202 itself, a user's hands, external controllers, or the like) or "outside-in" tracking, where external devices aid in tracking the position of the one or more elements.

The input/output 203f may be configured to receive and transmit data associated with an XR environment. For example, the input/output 203f may be configured to communicate data associated with movement of a user to the first computing device 201. As another example, the input/output 203f may be configured to receive information associated with other users of a massively multiplayer XR environment.

The second computing device 204 may be configured to provide, via the display devices 203a, the audio devices 203b, the motion sensitive devices 203c, the cameras 203d, the position tracking elements 203e, and/or the input/output 203f, the XR environment. The second computing device 204 may comprise one or more processors (e.g., a graphics processor), storage (e.g., that stores virtual reality programs), or the like. In general, the second computing device 204 may be powerful enough to provide the XR environment without using the first computing device 201, such that the first computing device 201 need not be required and need not be connected to the XR device 202. In other configurations, the second computing device 204 and the first computing device 201 may work in tandem to provide the XR environment. In other configurations, the XR device 202 might not have the second computing device 204, such that the first computing device 201 interfaces with the display devices 203a, the audio devices 203b, the motion sensitive devices 203c, the cameras 203d, the position tracking elements 203e, and/or the input/output 203f directly.

The above-identified elements of the XR device 202 are merely examples. The XR device 202 may have more or similar elements. For example, the XR device 202 may include in-ear EEG and/or HRV measuring devices, scalp and/or forehead-based EEG and/or HRV measurement devices, eye-tracking devices (e.g., using cameras directed at users' eyes, pupil tracking, infrared), or the like.

Authentication in Extended Reality

Figure 3:
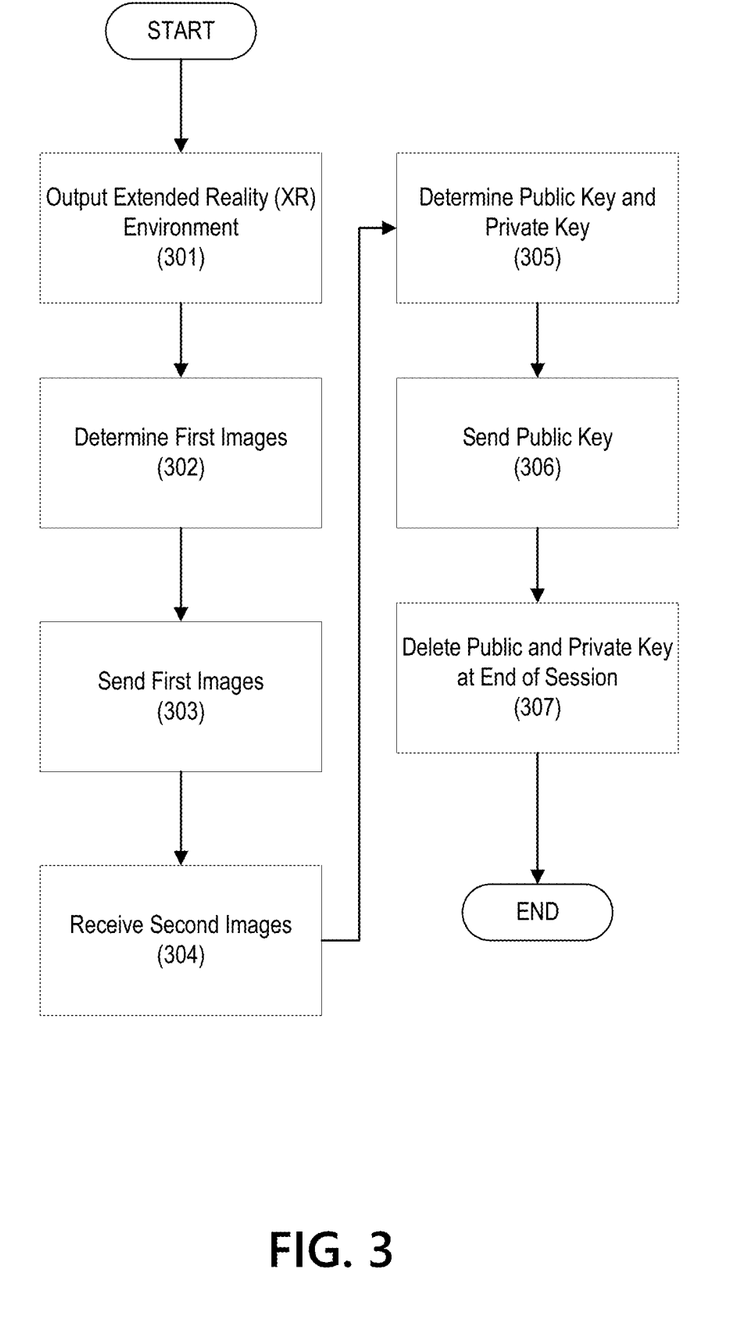
FIG. 3 depicts a flow chart comprising steps for XR environment authentication.

FIG. 3 depicts a flow chart which may be performed by one or more computing devices, such as the XR device 202, the first computing device 201, the second computing device 204, and the like. As such, a computing device may comprise one or more processors and memory storing instructions that, when executed by the one or more processors, may cause the performance of one or more steps of FIG. 3. Though shown in an order, the ordering of the flow chart shown in FIG. 3 may be rearranged, and/or intermediary steps may be permed in between any of the steps shown in FIG. 3.

As will be described in further detail below, the steps shown in FIG. 3 may be performed as part of a registration process or an authentication process. For example, the steps shown in FIG. 3 may be responsive to a request, by a user, to register a user with a server. As another example, the steps shown in FIG. 3 may be responsive to a request, by a user, to authenticate themselves with the server after they have previously registered with the server. As will be described in more detail below, the steps may be the same or similar at least because the process for registering a user may result in the same or a similar private key and/or public key as the process for authenticating a user.

In step 301, an XR environment may be output. The XR environment may be output by an XR device, such as the XR device 202. The XR environment may comprise one or more real objects and one or more virtual objects. For example, the XR environment may be an augmented reality environment where real objects are shown alongside virtual objects which are appended over the XR device user's view of the real objects. The XR environment may be associated with a session. For example, a user of the XR device may instantiate a session as part of initializing the XR environment.

Before or during output of the XR environment, a session may be instantiated with a server. The server may be local or remote to the device outputting the XR environment. The server may be, for example, a content server configured to store content for use in the XR environment. The server may be, for example, a server that provides multi-user functionality for the XR environment. The session might require authentication. For example, a user of a device outputting the XR environment might not be able to access content stored by the server (e.g., a particular private area of the XR environment) until the user is authenticated by the server. The session might require encryption. For example, to preserve the security of communications between the device outputting the XR environment and the server, it may be desirable to encrypt communications between the device and the server.

The instantiation of the session with the server may entail requesting registration with, or initializing authentication with, a server. For example, a user might put on an R device, such as the XR device 202, and may create a new session with a server or request access to an existing session with the server. In the former circumstance, the steps described in FIG. 3 may be part of a registration process. In the latter circumstance, the steps described in FIG. 3 may be part of a user authenticating themselves with the server.

In step 302, a plurality of first images may be determined. Each of the plurality of first images may correspond to a different object (whether real or virtual) in the XR environment. The first plurality of images may comprise a series of images (e.g., image files, screen captures, or the like) in a particular series. For example, the first plurality of images may comprise five sequentially-numbered image files stored on a memory of a computing device. The plurality of first images may be determined by a user looking at a series of objects in the XR environment. The ordering of the first images may be determined by the order in which the user in the XR environment looks at the objects. For example, a user of the XR device 202 may look at a nearby pencil (a physical object), a nearby chair (a physical object), a nearby dragon (a virtual object), a nearby desk (a physical object), and a nearby castle (a virtual object). One or more of the plurality of first images may be captured using a camera associated with the XR device (e.g., the camera(s) 203d). One or more of the plurality of first images may be captured by software executing on one or more computing devices (e.g., the first computing device 201, the second computing device 204, or the like). For example, if the object is virtual, a screen capture may be taken of the image displayed on a display (e.g., the display device(s) 203a of the XR device 202) to capture an image of the object.

The first plurality of images may comprise both images of physical objects and images of virtual objects. In this manner, the particular objects looked at by a user in the XR environment might not be readily ascertained by someone watching the user (e.g., someone watching the user as they turn their head to look at different physical and/or virtual objects). To better prevent observation of the object sequence, the location of one or more of the virtual objects displayed in the XR environment may be randomized.

In the XR environment, multiple objects (whether real or virtual) may be presented in the field of view of a user. For example, a user in an XR environment might have both a chair and a pencil in their field of view. In such circumstances, determining the first plurality of images may comprise selecting one of a plurality of objects in an image associated with the XR environment. For example, determining the first plurality of images may comprise determining a primary (e.g., most centered, most in-focus) object in a field of view of a user. Determining the first plurality of images may additionally and/or alternatively comprise receiving a further indication of an object in the XR environment. For example, a user might use an input method (e.g., a motion controller) to point at or otherwise gesture towards a particular object in the XR environment. Additionally and/or alternatively, a user may center an object in their field of view for a predetermined period of time to select that object. The method with which the user provides input to identify an object may change from object to object so as to obfuscate the selection process from view by onlookers. For example, a user might point at a first object, but simply look for a predetermined period of time at a second object.

In step 303, the first images may be sent to, for example, a server. The first images may be sent over a network, such as the Internet. For example, the first images may be sent to a server as part of an authentication process with the server and/or as part of instantiating a session with the server. As part of sending the images, the images may be cropped or otherwise altered. For example, the images may be cropped to remove content other than the object in the XR environment, such that less bandwidth is used to send the first images.

In step 304, a plurality of second images may be received. Each of the plurality of second images may correspond to one of the plurality of first images. The second images may comprise output from an image recognition algorithm based on one or more of the plurality of first images. For example, if one of the plurality of first images indicated that the user looked at a chair in the XR environment, then the corresponding image of the plurality of second images may comprise a generic image of a chair. The plurality of second images may be in the same order as the plurality of first images. For example, if the plurality of first images comprises an image of a real basketball, an image of a virtual baseball, and an image of a real chair, the plurality of second images may comprise a generic image of a basketball, a generic image of a baseball, and a generic image of a chair, and in that order. The plurality of second images need not be in the same format as the plurality of first images. For example, if the plurality of first images are cropped screenshots, having a first size and/or aspect ratio, the plurality of second images may comprise studio photographs of objects, and those photographs may have a second size and/or aspect ratio different from the first size and/or aspect ratio.

The plurality of second images may thereby be generic and/or standardized forms of the plurality of first images. In this manner, consistency may be achieved without requiring the user in the XR environment to look at an object in a particular manner. This allows the user to look at a chair and receive the same standardized image of a chair regardless of the angle, lighting, or other external considerations which might vary. In this manner, whether or not the user is registering for the first time or authenticating themselves after a previous registration, variance in the objects (e.g., how they are illuminated, the angle with which they are looked at, etc.) does not impact the ability of the user to register/authenticate themselves consistently.

In step 305, a public key and a private key may be determined. The public key and private key may be determined such that communications between a device associated with the XR environment and a server may be registered, authenticated, and/or encrypted. Determination of the public and private key may be performed based on the plurality of second images. For example, determination of the public key and private key may comprise determining bit strings based on bits of the plurality of second images, and then using algorithms such as a pseudorandom number algorithm on those bits to determine a public key and a private key.

The public key and private key may be determined by different bits in different images of the second plurality of images. A first bit string may be determined based on the first n bits of each of the plurality of second images. A second bit string may be determined based on the last m bits of each of the plurality of second images. For example, the first bit string and/or second bit string may comprise concatenated quantities of bits from each of the second plurality of images. Then bits and m bits may be the same quantity of bits, but may be different bits of the plurality of second images. For example, the first bit string may comprise the first twenty bits of each of the plurality of second images, whereas the first bit string may comprise the last twenty bits of each of the plurality of second images. As such, the first bit string and the second bit string may be different, though the number of bits may be the same. The n and m bits may be a different quantity of bits, such that the length of the first bit string and the second bit string may differ. This may be advantageous where, for example, it is desirable to have a longer private key as compared to the public key.

The public key and private key may be determined by taking one or more bits and using a pseudorandom string generator to generate a pseudorandom string (e.g., a pseudorandom number) based on those bits, and then using an algorithm, such as the Rivest-Shamir-Adleman (RSA) algorithm, to generate a public and/or private key based on that pseudorandom string. It may be desirable to, for example, generate a public key and/or a private key based on a pseudorandom string, such as a prime number determined using a pseudorandom number. For example, using a pseudorandom number generator, one or more bit strings may be used to generate a pseudorandom number, a prime number may be selected based on that pseudorandom number, and an algorithm may generate public and/or private keys based on that prime number. For example, a prime number may be selected based on a pseudorandom number by selecting the closest prime number to the pseudorandom number, and that prime number may be used by an algorithm to determine a public and/or private key.

One example of a pseudorandom number generator which may be used is a Linear Congruential Generator (LCG), which may provide pseudorandom numbers based on the following equation:

$$X_{N+1} = (aX_N + c) \bmod m$$

where X is a sequence of pseudorandom values, where the modulus m is a value greater than zero, where the multiplier a is greater than zero but less than m, where the increment c is greater or equal to zero but less than m, and where the seed $X_0$ is greater or equal to zero and less than m. The output of such a function is a value greater than m. In the context of use with an RSA algorithm, discussed in further detail below, m should be around 2048 bits for use in RSA 4096. Use of a pseudorandom number generator, instead of a random number generator, may enable subsequent authentication of a user using the same The public key and private key may be generated using the RSA algorithm, as discussed herein. A first prime number, p, may be selected based on a first bit string determined from the plurality of second images and using, e.g., a pseudorandom number generator as discussed above. A second prime number, q, may be generated based on a second bit string, different from the first bit string, determined from the plurality of second images and using, e.g., the aforementioned pseudorandom number generator. A value n may be generated, where n=pq. A totient, $\phi$, may be calculated as follows:

$$\phi(n) = (p-1)(q-1)$$

Then, an integer e may be selected such that $1<e<\phi(n)$, such that e is co-prime to $\phi(n)$. In other words, e and $\phi(n)$ may share no factors other than 1. Then, a decryption value d may be computed to satisfy the congruence relation de≡1. In this manner, de=1+x$\phi$(n) for some integer x. Using these values, the public key may comprise the modulus of all or portions of n and e, whereas the private key may comprise portions of p, q, and d.

An example of using the LCG pseudorandom number generator and the RSA algorithm is provided herein. A first bit string and a second bit string may be determined based on the second plurality of images. Both the first bit string and the second bit string may be used as the seed value $X_0$ in the LCG pseudorandom number generator to determine a first pseudorandom number and a second pseudorandom number. A first prime number and a second prime number may be selected based on the first pseudorandom number and the second pseudorandom number. For example, the first prime number may be the first prime number greater than the first pseudorandom number. The first prime number and second prime number may each be used as the p and q values of the RSA algorithm described above to generate a public and private key.

In step 306, the public key may be sent to, e.g., the server. The public key may be used by a device associated with the XR environment and the server to authenticate subsequent communications between the device and the server. The private key may be stored by a device associated with the XR environment and may also be used by the device to authenticate subsequent communications between the device and a server.

Sending the public key to the server may comprise registering and/or authenticating a user with the server. Sending the public key to the server may comprise sending the public key to the sever to register a user (e.g., of an XR device) with the server, such that the user might later authenticate themselves in a similar manner to access content stored by the server. Sending the public key to the server may additionally and/or alternatively comprise sending the public key to the server to authenticate the user with the server, such that the user might access stored content and/or a session of the server.

In step 307, upon the end of a session between a device associated with the XR environment and a server, the public and/or private key may be deleted. Such deletion is optional, and the public and/or private key might not be deleted. For example, deletion of the public and/or private keys might not be performed if, for example, further authentication (e.g., at a later time) is anticipated. Step 307 may comprise determining that a user of the XR environment has exited the XR environment. For example, responsive to determining that a user has removed the XR device (e.g., by removing it from their head, if it is worn on their head), the session may be terminated, and the public and/or private key may be deleted.

Figure 4:
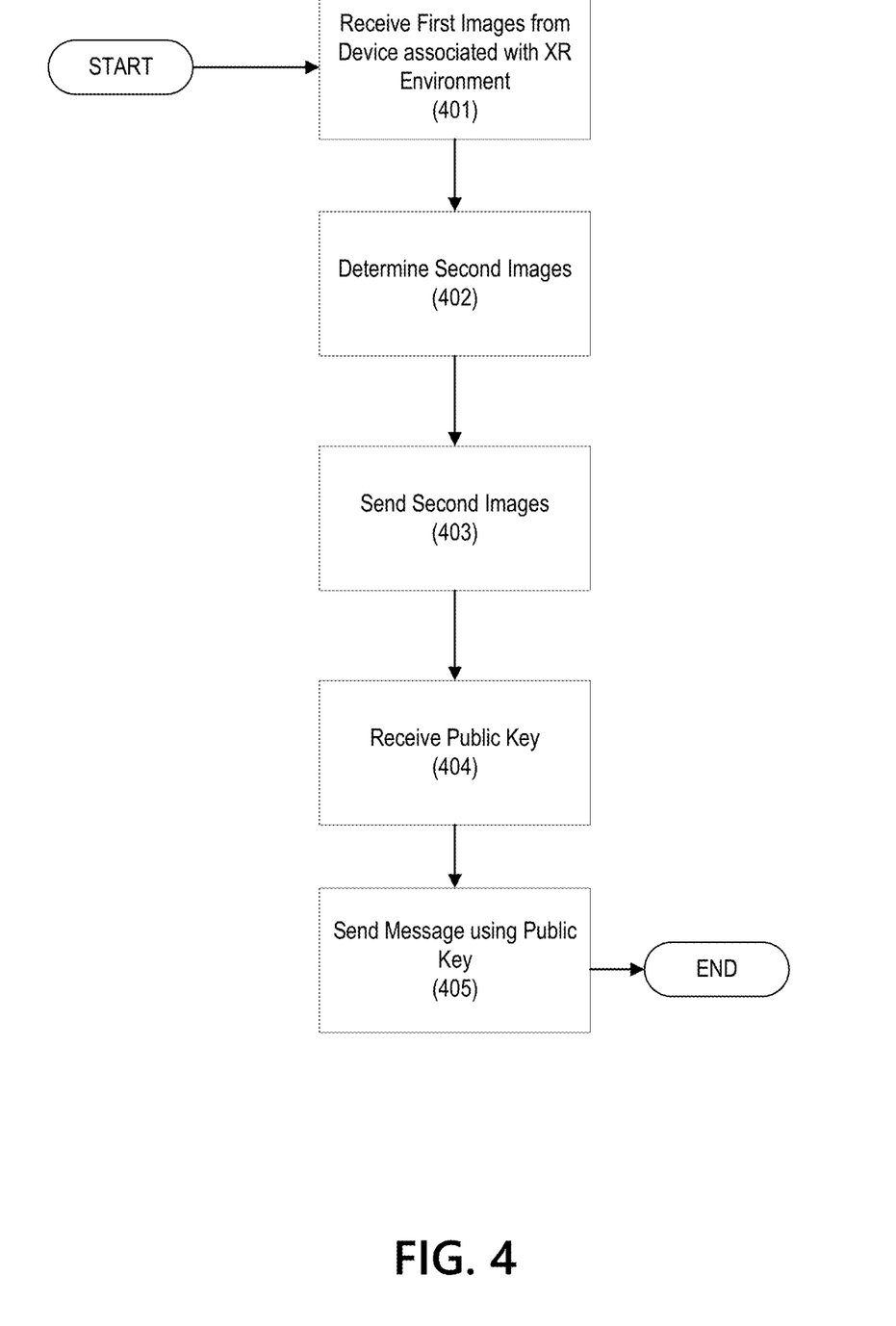
FIG. 4 depicts a flow chart comprising steps a server may take as part of XR environment registration or authentication.

FIG. 4 depicts steps which may be performed by a server. The server may be the same or similar as the first computing device 201. The server may be remote from an XR device (e.g., the XR device 202) providing an XR environment. As such, a computing device may comprise one or more processors and memory storing instructions that, when executed by the one or more processors, may cause the performance of one or more steps of FIG. 4. Though shown in an order, the ordering of the flow chart shown in FIG. 4 may be rearranged, and/or intermediary steps may be permed in between any of the steps shown in FIG. 4.

In step 401, the server may receive a plurality of first images from a device associated with an XR environment. The plurality of first images may be the same or similar as those described with respect to steps 302 and 303 of FIG. 3. As such, each of the plurality of first images may correspond to a different real or virtual object in the XR environment.

In step 402, a plurality of second images may be determined based on the plurality of first images. The plurality of second images may comprise generic or otherwise standardized representations of the plurality of first images. The server may determine an identity of each object in the plurality of first images using, for example, an image recognition algorithm. The server may retrieve, from a database, an image that corresponds to the identity of each object of the plurality of first images. The images retrieved from the server may comprise, for example, generic images that represent the identity of the plurality of first images. For example, if one of the plurality of first images shows a chair, the corresponding image in the plurality of second images may comprise a generic image (e.g., a black-and-white drawing, a stock photo) showing a chair.

In step 403, the plurality of second images may be sent to the device associated with the XR environment. The plurality of second images may be sent over a network, such as the Internet. The plurality of second images may be configured to indicate a sequence of the plurality of second images, such that a sequence of the plurality of first images is preserved. For example, each of the plurality of second images may be named in a manner which indicates its ordering relationship to other images of the plurality of second images.

In step 404, the server may receive a public key from the device associated with the XR environment. The public key may have been generated based on the plurality of second images. For example, the public key may have been generated by the device associated with the XR environment in the manner discussed with respect to step 305 of FIG. 3.

In step 405, the server may send a message to the device associated with the XR environment. The message may be encrypted or otherwise configured based on the public key received in step 404. For example, the message may be encrypted using the public key.

The following paragraphs (M1) through (M20) describe examples of methods that may be implemented in accordance with the present disclosure.

(M1) A method comprising outputting, by a computing device and for display on a device configured to be worn by a user, an extended reality (XR) environment; determining, by the computing device and via the XR environment, a first plurality of images, wherein the first plurality of images is determined based on the user looking at a plurality of objects in the XR environment; sending, by the computing device and to a server, the first plurality of images; receiving, by the computing device and from the server, a second plurality of images, wherein each of the second plurality of images corresponds to a different image of the first plurality of images; determining, based on a first portion of the second plurality of images, a public key; determining, based on a second portion of the second plurality of images, a private key; and sending, to the server and to authenticate subsequent communications between the computing device and the server, the public key.

(M2) A method may be performed as described in paragraph (M1) wherein determining the public key comprises: concatenating at least a quantity of bits of each of the second plurality of images to generate a bit string; and determining, based on the bit string and using a pseudorandom number generator, the public key.

(M3) A method may be performed as described in paragraph (M2) wherein the public key is a prime number determined using a pseudorandom number generator and based on the bit string.

(M4) A method may be performed as described in any of paragraphs (M2) through (M3) wherein determining the private key comprises: concatenating at least a second quantity of bits of each of the second plurality of images to generate a second bit string, wherein the second bit string is different from the bit string; and determining, based on the second bit string and using the pseudorandom number generator, the private key.

(M5) A method may be performed as described in any of paragraphs (M1) through (M4) wherein at least one of the first plurality of images corresponds to a physical object located within view of the user.

(M6) A method may be performed as described in any of paragraphs (M1) through (M5) wherein at least one of the first plurality of images corresponds to a virtual object displayed in the XR environment.

(M7) A method may be performed as described in paragraph (M6) wherein a location of the virtual object is randomized in the XR environment.

(M8) A method may be performed as described in any of paragraphs (M1) through (M7) wherein each of the second plurality of images corresponds to output, based on the first plurality of images, from an image recognition algorithm.

(M9) A method may be performed as described in any of paragraphs (M1) through (M8) further comprising instantiating a session corresponding to the XR environment; determining that the user has exited the XR environment; and deleting, from storage, the public key and the private key.

(M10) A method may be performed as described in any of paragraphs (M1) through (M9) wherein the first portion of the second plurality of images comprises a first quantity of bits of each of the second plurality of images, and wherein the second portion of the second plurality of images comprises a second quantity of bits of each of the second plurality of images.

(M11) A method comprising outputting, by a computing device and for display on a device configured to be worn by a user, an extended reality (XR) environment; determining, via the XR environment, a first plurality of images corresponding to a plurality of objects in the XR environment; determining, using an image recognition algorithm and based on the first plurality of images, a second plurality of images; determining a public key by: generating a first bit string based on a first quantity of bits from each of the second plurality of images; and determining, based on the first bit string and using a pseudorandom number generator, the public key; determining a private key by: generating a second bit string based on a second quantity of bits from each of the second plurality of images; determining, based on the second bit string and using the pseudorandom number generator, the private key; storing the private key; and sending, to a server and to authenticate subsequent communications between the computing device and the server, the public key.

(M12) A method may be performed as described in paragraph (M11) wherein at least one of the first plurality of images corresponds to a physical object visible in the XR environment.

(M13) A method may be performed as described in any one of paragraphs (M11) to (M12) wherein at least one of the first plurality of images corresponds to a virtual object displayed in the XR environment.

(M14) A method may be performed as described in paragraph (M13) wherein a location of the virtual object is randomized in the XR environment.

(M15) A method may be performed as described in any one of paragraphs (M11) to (M14) wherein the first quantity of bits from each of the second plurality of images comprises the first n bits of each of the second plurality of images, and wherein the second quantity of bits from each of the second plurality of images comprises the last m bits of each of the second plurality of images.

(M16) A method may be performed as described in any one of paragraphs (M11) to (M15) wherein determining the second plurality of images comprises: determining an identity of each object in the first plurality of images; and determining an image that corresponds to the identity of each object in the first plurality of images.

(M17) A method comprising receiving, by a server and from a computing device, a first plurality of images, wherein each of the first plurality of images correspond to an image of an object in an extended reality (XR) environment; determining, by the server, a second plurality of images by: determining, using an image recognition algorithm, an identity of each object in the first plurality of images; and retrieving, from a database, an image that corresponds to the identity of each object in the first plurality of images; sending, by the server and to the computing device, the second plurality of images; and receiving, by the server and from the computing device, a public key configured to authenticate subsequent communications between the computing device and the server, wherein the public key is generated based on the second plurality of images.

(M18) A method may be performed as described in paragraph (M17) wherein at least one of the first plurality of images corresponds to a physical object visible in the XR environment.

(M19) A method may be performed as described in any one of paragraphs (M17) to (M18) wherein at least one of the first plurality of images corresponds to a virtual object displayed in the XR environment.

(M20) A method may be performed as described in any one of paragraphs (M17) to (M19) further comprising: sending, by the server and to the computing device, a message encrypted based on the public key.

The following paragraphs (A1) through (A20) describe examples of apparatuses that may be implemented in accordance with the present disclosure.

(A1) An apparatus comprising one or more processors and memory storing instructions that, when executed by the one or more processors, cause the apparatus to: output, and for display on a device configured to be worn by a user, an extended reality (XR) environment; determine, via the XR environment, a first plurality of images, wherein the first plurality of images is determined based on the user looking at a plurality of objects in the XR environment; send, to a server, the first plurality of images; receive, from the server, a second plurality of images, wherein each of the second plurality of images corresponds to a different image of the first plurality of images; determine, based on a first portion of the second plurality of images, a public key; determine, based on a second portion of the second plurality of images, a private key; and send, to the server and to authenticate subsequent communications between the apparatus and the server, the public key.

(A2) An apparatus as described in paragraph (A1) wherein the instructions, when executed by the one or more processors, cause the apparatus to determine the public key by: concatenating at least a quantity of bits of each of the second plurality of images to generate a bit string; and determining, based on the bit string and using a pseudorandom number generator, the public key.

(A3) An apparatus as described in paragraph (A2) wherein the public key is a prime number determined using a pseudorandom number generator and based on the bit string.

(A4) An apparatus as described in any of paragraphs (A2) through (A3) wherein the instructions, when executed by the one or more processors, cause the apparatus to determine the public key by: concatenating at least a second quantity of bits of each of the second plurality of images to generate a second bit string, wherein the second bit string is different from the bit string; and determining, based on the second bit string and using the pseudorandom number generator, the private key.

(A5) An apparatus as described in any of paragraphs (A1) through (A4) wherein at least one of the first plurality of images corresponds to a physical object located within view of the user.

(A6) An apparatus as described in any of paragraphs (A1) through (A5) wherein at least one of the first plurality of images corresponds to a virtual object displayed in the XR environment.

(A7) An apparatus as described in paragraph (A6) wherein a location of the virtual object is randomized in the XR environment.

(A8) An apparatus as described in any of paragraphs (A1) through (A7) wherein each of the second plurality of images corresponds to output, based on the first plurality of images, from an image recognition algorithm.

(A9) An apparatus as described in any of paragraphs (A1) through (A8) wherein the instructions, when executed by the one or more processors, further cause the apparatus to instantiate a session corresponding to the XR environment; determine that the user has exited the XR environment; and delete, from storage, the public key and the private key.

(A10) An apparatus as described in any of paragraphs (A1) through (A9) wherein the first portion of the second plurality of images comprises a first quantity of bits of each of the second plurality of images, and wherein the second portion of the second plurality of images comprises a second quantity of bits of each of the second plurality of images.

(A11) An apparatus comprising one or more processors and memory storing instructions that, when executed by the one or more processors, cause the apparatus to: output, for display on a device configured to be worn by a user, an extended reality (XR) environment; determine, via the XR environment, a first plurality of images corresponding to a plurality of objects in the XR environment; determine, using an image recognition algorithm and based on the first plurality of images, a second plurality of images; determine a public key by: generating a first bit string based on a first quantity of bits from each of the second plurality of images; and determining, based on the first bit string and using a pseudorandom number generator, the public key; determine a private key by: generating a second bit string based on a second quantity of bits from each of the second plurality of images; and determining, based on the second bit string and using the pseudorandom number generator, the private key; store the private key; and send, to a server and to authenticate subsequent communications between the apparatus and the server, the public key.

(A12) An apparatus as described in paragraph (A11) wherein at least one of the first plurality of images corresponds to a physical object visible in the XR environment.

(A13) An apparatus as described in any one of paragraphs (A11) to (A12) wherein at least one of the first plurality of images corresponds to a virtual object displayed in the XR environment.

(A14) An apparatus as described in paragraph (A13) wherein a location of the virtual object is randomized in the XR environment.

(A15) An apparatus as described in any one of paragraphs (A11) to (A14) wherein the first quantity of bits from each of the second plurality of images comprises the first n bits of each of the second plurality of images, and wherein the second quantity of bits from each of the second plurality of images comprises the last m bits of each of the second plurality of images.

(A16) An apparatus as described in any one of paragraphs (A11) to (A15) wherein the instructions, when executed by the one or more processors, cause the apparatus to determine the second plurality of images by: determining an identity of each object in the first plurality of images; and determining an image that corresponds to the identity of each object in the first plurality of images.

(A17) An apparatus comprising one or more processors and memory storing instructions that, when executed by the one or more processors, cause the apparatus to: receive, from a computing device, a first plurality of images, wherein each of the first plurality of images correspond to an image of an object in an extended reality (XR) environment; determine a second plurality of images by: determining, using an image recognition algorithm, an identity of each object in the first plurality of images; and retrieving, from a database, an image that corresponds to the identity of each object in the first plurality of images; send, to the computing device, the second plurality of images; and receive, from the computing device, a public key configured to authenticate subsequent communications between the computing device and the server, wherein the public key is generated based on the second plurality of images.

(A18) An apparatus as described in paragraph (A17) wherein at least one of the first plurality of images corresponds to a physical object visible in the XR environment.

(A19) An apparatus as described in any one of paragraphs (A17) to (A18) wherein at least one of the first plurality of images corresponds to a virtual object displayed in the XR environment.

(A20) An apparatus as described in any one of paragraphs (A17) to (A19) wherein the instructions, when executed by the one or more processors, cause the apparatus to send, to the computing device, a message encrypted based on the public key.

The following paragraphs (CRM1) through (CRM20) describe examples of computer-readable media that may be implemented in accordance with the present disclosure.

(CRM1) A non-transitory computer-readable medium storing instructions that, when executed, cause an apparatus to: output, and for display on a device configured to be worn by a user, an extended reality (XR) environment; determine, via the XR environment, a first plurality of images, wherein the first plurality of images is determined based on the user looking at a plurality of objects in the XR environment; send, to a server, the first plurality of images; receive, from the server, a second plurality of images, wherein each of the second plurality of images corresponds to a different image of the first plurality of images; determine, based on a first portion of the second plurality of images, a public key; determine, based on a second portion of the second plurality of images, a private key; and send, to the server and to authenticate subsequent communications between the apparatus and the server, the public key.

(CRM2) A non-transitory computer-readable medium as described in paragraph (CRM1) wherein the instructions, when executed, cause the apparatus to determine the public key by: concatenating at least a quantity of bits of each of the second plurality of images to generate a bit string; and determining, based on the bit string and using a pseudorandom number generator, the public key.

(CRM3) A non-transitory computer-readable medium as described in paragraph (CRM2) wherein the public key is a prime number determined using a pseudorandom number generator and based on the bit string.

(CRM4) A non-transitory computer-readable medium as described in any of paragraphs (CRM2) through (CRM3) wherein the instructions, when executed, cause the apparatus to determine the public key by: concatenating at least a second quantity of bits of each of the second plurality of images to generate a second bit string, wherein the second bit string is different from the bit string; and determining, based on the second bit string and using the pseudorandom number generator, the private key.

(CRM5) A non-transitory computer-readable medium as described in any of paragraphs (CRM1) through (CRM4) wherein at least one of the first plurality of images corresponds to a physical object located within view of the user.

(CRM6) A non-transitory computer-readable medium as described in any of paragraphs (CRM1) through (CRM5) wherein at least one of the first plurality of images corresponds to a virtual object displayed in the XR environment.

(CRM7) A non-transitory computer-readable medium as described in paragraph (CRM6) wherein a location of the virtual object is randomized in the XR environment.

(CRM8) A non-transitory computer-readable medium as described in any of paragraphs (CRM1) through (CRM7) wherein each of the second plurality of images corresponds to output, based on the first plurality of images, from an image recognition algorithm.

(CRM9) A non-transitory computer-readable medium as described in any of paragraphs (CRM1) through (CRM8) wherein the instructions, when executed, further cause the apparatus to instantiate a session corresponding to the XR environment; determine that the user has exited the XR environment; and delete, from storage, the public key and the private key.

(CRM10) A non-transitory computer-readable medium as described in any of paragraphs (CRM1) through (CRM9) wherein the first portion of the second plurality of images comprises a first quantity of bits of each of the second plurality of images, and wherein the second portion of the second plurality of images comprises a second quantity of bits of each of the second plurality of images.

(CRM11) A non-transitory computer-readable medium storing instructions that, when executed, cause an apparatus to: output, for display on a device configured to be worn by a user, an extended reality (XR) environment; determine, via the XR environment, a first plurality of images corresponding to a plurality of objects in the XR environment; determine, using an image recognition algorithm and based on the first plurality of images, a second plurality of images; determine a public key by: generating a first bit string based on a first quantity of bits from each of the second plurality of images; and determining, based on the first bit string and using a pseudorandom number generator, the public key; determine a private key by: generating a second bit string based on a second quantity of bits from each of the second plurality of images; and determining, based on the second bit string and using the pseudorandom number generator, the private key; store the private key; and send, to a server and to authenticate subsequent communications between the apparatus and the server, the public key.

(CRM12) A non-transitory computer-readable medium as described in paragraph (CRM11) wherein at least one of the first plurality of images corresponds to a physical object visible in the XR environment.

(CRM13) A non-transitory computer-readable medium as described in any one of paragraphs (CRM11) to (CRM12) wherein at least one of the first plurality of images corresponds to a virtual object displayed in the XR environment.

(CRM14) A non-transitory computer-readable medium as described in paragraph (CRM13) wherein a location of the virtual object is randomized in the XR environment.

(CRM15) A non-transitory computer-readable medium as described in any one of paragraphs (CRM11) to (CRM14) wherein the first quantity of bits from each of the second plurality of images comprises the first n bits of each of the second plurality of images, and wherein the second quantity of bits from each of the second plurality of images comprises the last m bits of each of the second plurality of images.

(CRM16) A non-transitory computer-readable medium as described in any one of paragraphs (CRM11) to (CRM15) wherein the instructions, when executed, cause the apparatus to determine the second plurality of images by: determining an identity of each object in the first plurality of images; and determining an image that corresponds to the identity of each object in the first plurality of images.

(CRM17) A non-transitory computer-readable medium storing instructions that, when executed, cause an apparatus to: receive, from a computing device, a first plurality of images, wherein each of the first plurality of images correspond to an image of an object in an extended reality (XR) environment; determine a second plurality of images by: determining, using an image recognition algorithm, an identity of each object in the first plurality of images; and retrieving, from a database, an image that corresponds to the identity of each object in the first plurality of images; send, to the computing device, the second plurality of images; and receive, from the computing device, a public key configured to authenticate subsequent communications between the computing device and the server, wherein the public key is generated based on the second plurality of images.

(CRM18) A non-transitory computer-readable medium as described in paragraph (CRM17) wherein at least one of the first plurality of images corresponds to a physical object visible in the XR environment.

(CRM19) A non-transitory computer-readable medium as described in any one of paragraphs (CRM17) to (CRM18) wherein at least one of the first plurality of images corresponds to a virtual object displayed in the XR environment.

(CRM20) A non-transitory computer-readable medium as described in any one of paragraphs (CRM17) to (CRM19) wherein the instructions, when executed, cause the apparatus to send, to the computing device, a message encrypted based on the public key.

Although the subject matter has been described in language specific to structural features and/or methodological acts, it is to be understood that the subject matter defined in the appended claims is not necessarily limited to the specific features or acts described above.

Rather, the specific features and acts described above are described as example implementations of the following claims.

What is claimed is:

1. A computing device comprising:
   one or more processors; and
   memory storing instructions that, when executed by the one or more processors, cause the computing device to:
   output, for display on a device configured to be worn by a user, an extended reality (XR) environment;
   determine, via the XR environment, a first plurality of images, wherein the first plurality of images is determined based on the user looking at a plurality of objects in the XR environment;
   send, to a server, the first plurality of images;
   receive, from the server, a second plurality of images, wherein each of the second plurality of images corresponds to a different image of the first plurality of images;
   determine, based on a first plurality of bits that is determined based on bits of the second plurality of images, a public key;
   determine, based on a second plurality of bits that is determined based on bits of the second plurality of images, a private key, wherein the second plurality of bits is different from the first plurality of bits; and
   send, to the server and to authenticate subsequent communications between the computing device and the server, the public key.

2. The computing device of claim 1, wherein the instructions, when executed by the one or more processors, cause the computing device to determine the public key by causing the computing device to:
   concatenate at least a quantity of bits of each of the second plurality of images to generate the first plurality of bits; and
   determine, based on the first plurality of bits and using a pseudorandom number generator, the public key.

3. The computing device of claim 2, wherein the public key is a prime number determined using a pseudorandom number generator and based on the first plurality of bits.

4. The computing device of claim 2, wherein the instructions, when executed by the one or more processors, cause the computing device to determine the private key by causing the computing device to:
   concatenate at least a second quantity of bits of each of the second plurality of images to generate the second plurality of bits; and
   determine, based on the second plurality of bits and using the pseudorandom number generator, the private key.

5. The computing device of claim 1, wherein at least one of the first plurality of images corresponds to a physical object located within view of the user.

6. The computing device of claim 1, wherein at least one of the first plurality of images corresponds to a virtual object displayed in the XR environment.

7. The computing device of claim 6, wherein a location of the virtual object is randomized in the XR environment.

8. The computing device of claim 1, wherein each of the second plurality of images corresponds to output, based on the first plurality of images, from an image recognition algorithm.

9. The computing device of claim 1, wherein the instructions, when executed by the one or more processors, cause the computing device to:
   instantiate a session corresponding to the XR environment;
   determine that the user has exited the XR environment; and
   delete, from storage, the public key and the private key.

10. The computing device of claim 1, wherein the first plurality of bits comprises a first quantity of bits of each of the second plurality of images, and wherein the second plurality of bits comprises a second quantity of bits of each of the second plurality of images.

11. A computing device comprising:
one or more processors; and
memory storing instructions that, when executed by the one or more processors, cause the computing device to:
output, for display on a device configured to be worn by a user, an extended reality (XR) environment;
determine, via the XR environment, a first plurality of images corresponding to a plurality of objects in the XR environment;
determine, using an image recognition algorithm and based on the first plurality of images, a second plurality of images;
determine a public key by:
generating a first bit string based on a first quantity of bits from each of the second plurality of images; and
determining, based on the first bit string and using a pseudorandom number generator, the public key;
determine a private key by:
generating a second bit string based on a second quantity of bits from each of the second plurality of images; and
determining, based on the second bit string and using the pseudorandom number generator, the private key;
store the private key; and
send, to a server and to authenticate subsequent communications between the computing device and the server, the public key.

12. The computing device of claim 11, wherein at least one of the first plurality of images corresponds to a physical object visible in the XR environment.

13. The computing device of claim 11, wherein at least one of the first plurality of images corresponds to a virtual object displayed in the XR environment.

14. The computing device of claim 13, wherein a location of the virtual object is randomized in the XR environment.

15. The computing device of claim 11, wherein the first quantity of bits from each of the second plurality of images comprises the first n bits of each of the second plurality of images, and wherein the second quantity of bits from each of the second plurality of images comprises the last m bits of each of the second plurality of images.

16. The computing device of claim 11, wherein the instructions, when executed by the one or more processors, cause the computing device to determine the second plurality of images by causing the computing device to:
determine an identity of each object in the first plurality of images; and
determine an image that corresponds to the identity of each object in the first plurality of images.

17. A server comprising:
one or more processors; and
memory storing instructions that, when executed by the one or more processors, cause the server to:
receive, from a computing device, a first plurality of images, wherein each of the first plurality of images correspond to an image of an object in an extended reality (XR) environment;
determine a second plurality of images by:
determine, using an image recognition algorithm, an identity of each object in the first plurality of images; and
retrieve, from a database, an image that corresponds to the identity of each object in the first plurality of images;
send, to the computing device, the second plurality of images; and
receive, from the computing device, a public key configured to authenticate subsequent communications between the computing device and the server, wherein the public key is generated based on a plurality of bits determined based on bits of the second plurality of images.

18. The server of claim 17, wherein at least one of the first plurality of images corresponds to a physical object visible in the XR environment.

19. The server of claim 17, wherein at least one of the first plurality of images corresponds to a virtual object displayed in the XR environment.

20. The server of claim 17, wherein the instructions, when executed by the one or more processors, cause the server to:
send, to the computing device, a message encrypted based on the public key.

* * * * *